Feb. 18, 1941.        R. C. NEWTON ET AL        2,232,401
                    TREATMENT OF MARGARINE
                      Filed Nov. 21, 1936
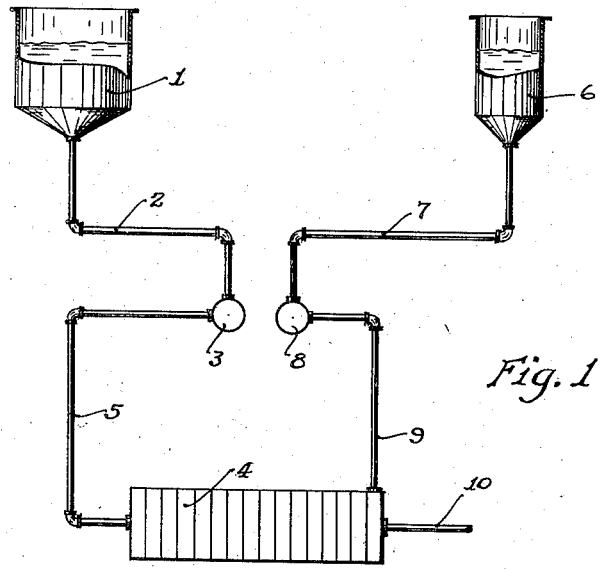
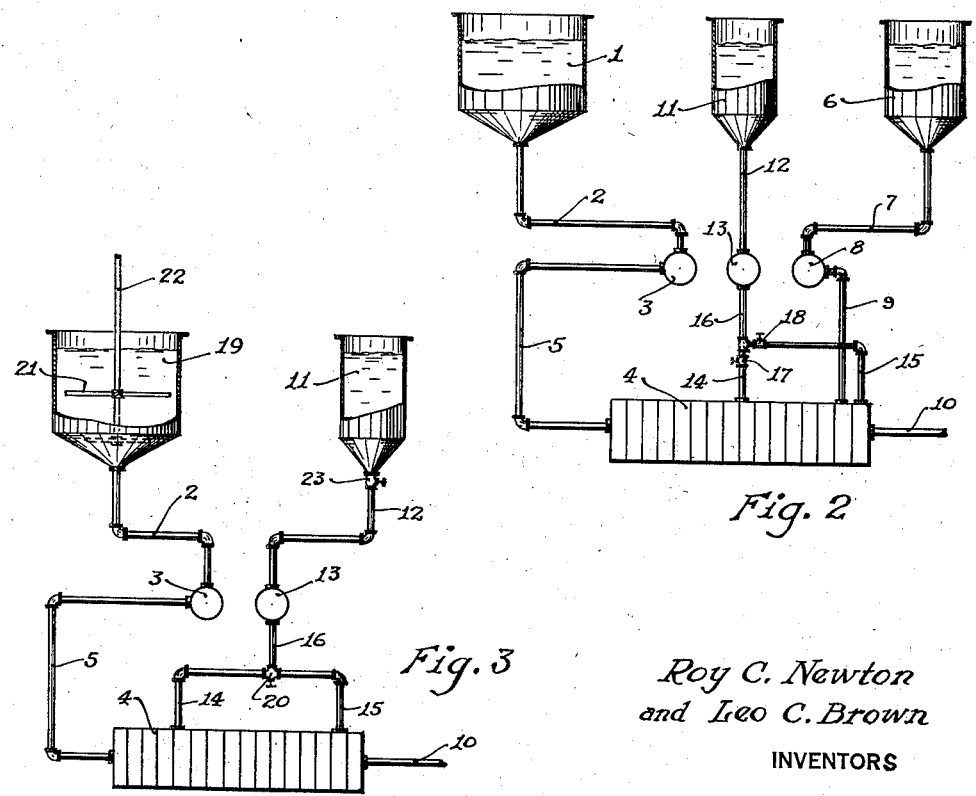
Roy C. Newton
and Leo C. Brown
INVENTORS Patented Feb. 18, 1941

2,232,401

UNITED STATES PATENT OFFICE 2,232,401

TREATMENT OF MARGARINE

Roy C. Newton and Leo C. Brown, Chicago, Ill., assignors to Industrial Patents Corporation, Chicago, Ill., a corporation of Delaware Application November 21, 1936, Serial No. 112,158

18 Claims. (Cl. 99—123)

This invention relates to the preparation of emulsions.

One of the objects of the invention is to provide an improved process for treating oleomargarine and similar emulsions whereby a very finely emulsified product is produced.

Other objects will be apparent from the description and claims which follow.

In the application entitled Preparation of emulsion, Serial No. 756,506, which issued November 2, 1937, as Patent No. 2,098,010, and which application was a continuation in part of the application entitled Method of chilling and emulsifying oleomargarine, etc. Serial No. 660,459, filed March 13, 1933, an improved process of preparing emulsions employing supercooling is described. In the application entitled Treatment of shortening, Serial No. 629,998, filed August 22, 1932, there is disclosed the effect of superglycerinating shortening to improve creaming properties and for other purposes set out in the specification.

It is known that fatty esters containing unesterified hydroxyl groups function as emulsifying agents. It is also known that glycerin reacts with glycerides to form what is sometimes termed a superglycerinated fat and sometimes termed monoglycerides and diglycerides.

The present invention contemplates the production of an extremely tight water in oil emulsion by the addition of an active emulsifying agent, such as superglycerinated fat, and the subjection of the emulsion including the emulsifying agent to a supercooling process. The preferred emulsifying agent is an ester of a fatty acid and a polyhydric alcohol having one or more free alcoholic hydroxyl groups on the polyhydric alcohol component of the ester. Specifically, the substance may be monoacid glyceride, diacid glyceride, monoacid ester of ethylene glycol, monoacid ester of diethylene glycol, or any ester of a polyhydric alcohol and a higher fatty acid characterized by having one or more free alcoholic hydroxyl groups.

By way of illustration but not by way of limitation, the invention will be hereinafter described in terms of the employment of monoacid or diacid glyceride, that is, glyceryl esters of a fatty acid having free hydroxyl groups as the active emulsifying agent.

The manner of carrying out the process of the invention will be better understood by reference to the drawing in which Figure 1 is a diagrammatic view of suitable equipment for carrying out one modification of the process.

Figure 2 is a diagrammatic view of apparatus for carrying out another modification of the process.

Figure 3 is a diagrammatic view of apparatus for carrying out another modification of the process.

In the manufacture of oleomargarine, it is customary to mix or churn milk and salt with melted oils, forming an emulsion which is chilled by spraying directly into cold water or chilling on a refrigerated drum.

It has also been proposed to add milk to heated oil in a vessel provided with agitators, producing an emulsion which after maturing and salting is cooled by cold water circulating through a jacket about the vessel, the emulsion being agitated during cooling.

In the Patent No. 2,098,010, to which reference has been made, it is proposed to chill an oleomargarine emulsion in such a machine as is described and claimed in U. S. Patent No. 1,952,638 to Taylor, the term "supercooling" being employed in the sense in which that term is used in U. S. Patent No. 1,911,222 to Bollens and Newton.

Referring more particularly to Figure 1.

Oil is drawn from tank 1 through pipe 2 by proportioning pump 3 and passed into supercooling chamber 4 through pipe 5. Milk and salt is drawn from tank 6 through pipes 7 and proportioning pump 8 and forced into supercooling chamber 4 through pipe 9, the supercooled product being withdrawn through pipe 10.

In carrying out the process of the present invention with the apparatus depicted in Figure 1, the emulsifying agent is dissolved in the oil in tank 1. The other ingredients, namely milk and salt contained in tank 6 are proportioned by means of a proportionometer and added to the supercooling chamber at some point in the supercooling chamber following the introduction of the oil.

The process employing the apparatus in Figure 1 may be varied by adding the emulsifying agent to the milk and salt mix rather than to the oil, the consequent steps of the process being otherwise the same.

The apparatus shown in Figure 2 differs essentially from that shown in Figure 1 in the employment of a separate emulsifying agent holding tank and the employment of triple proportioning pumps. The oil is drawn from tank 1 through pipe 2 by pump 3 and delivered to supercooling chamber 4 by pipe 5. The milk and salt mix is drawn from tank 6 through pipe 7 by pump 8 and delivered to supercooling chamber 4 through pipe 9. The emulsifying agent, for example, melted superglycerinated fat, is drawn from tank 11 through pipe 12 and pump 13 and delivered to supercooling chamber 4 through either pipe 14 or pipe 15 branching from pipe 16. Pipe 14 is provided with valve 17 and pipe 15 is provided with valve 18 to control the point of addition of the emulsifying agent.

The supercooled product is removed from supercooling chamber 4 through pipe 10. In carrying out the process with the apparatus depicted in Figure 2, the oils, superglycerinated fat, and milk which contains salt in solution, are proportioned by means of a proportionometer and added separately to the supercooling chamber. The milk containing salt in solution is added at some point farther along than the intake of the oil, and the superglycerinated fat is added either ahead of the addition of the milk or behind the addition of the milk as may be desired, depending upon the formula used and the degree of tightness of emulsion desired.

In the apparatus depicted in Figure 3, liquid material from mixing tank 19 may be drawn through pipe 2 by pump 3 and delivered to supercooling chamber 4 through pipe 5. Superglycerinated fat in melted form is drawn from holding tank 11 through pipe 12 by pump 13 and delivered to supercooling chamber 4 through pipe 14 or pipe 15, branching from pipe 16. Three-way valve 20 is provided to control the flow of emulsfying agent through pipe 14 or 15 as desired. The supercooled product is discharged from supercooling chamber 4 through pipe 10. It will be noted that mixing tank 19 is provided with agitator blades 21 mounted upon shaft 22. An emulsion is formed of oils, milk and salt in mixing tank 19 which is relatively coarse and delivered to the supercooling chamber 4 as an emulsion, emulsifying agents being added through pipe 14 or 15 as may be desired, depending upon the formula of the emulsion and the tightness of final emulsion desired.

The apparatus shown in Figure 3 may be employed in another modification of the process in which the emulsifying agent is added directly to the other ingredients of the emulsion in tank 19, being delivered to the supercooling chamber 4 as a complete emulsion including the emulsifying agent. In such an instance pump 13 is not employed nor is any proportionometer needed as is the case when the emulsifying agent is fed from a separate tank.

In this modification the proportions are secured directly in the mixing tank and tank 11 may be cut off the system by closing valve 23.

The present invention permits the production of a special baker's margarine which, because of the manner in which it is chilled and because of the presence of superglycerinated fat preferably in amounts up to five per cent or more, permits the production of special cakes due to increased ability of the margarine to emulsify well with aqueous and water soluble ingredients found in cake batter. A satisfactory product for most cake products contains three to three and one-half per cent of the emulsifying agent.

The present invention permits the production of margarine with smoother, finer grained body than has heretofore been possible. This smoother margarine with its finer grained body results from the action of the superglycerinated fat upon crystal formation of a supercooled fat. The advantages are found to occur whether the preformed melted emulsion including the emulsifying agent is passed through an internal chilling machine as well as when the various ingredients of the end product are added at different stages, it being necessary, however, that oil be introduced either before the other ingredients are introduced or with the other ingredients. The order of introduction of the aqueous material and the emulsifying agent may be varied at will to bring about modified crystal structure in specific cases.

The product resulting from the process of the present invention is a margarine in which the water remains finely dispersed throughout the fat after solidification. This fine dispersion provides a margarine which may be employed in industrial baking and household cookery in the fabrication of cakes to impart a desirable aroma and flavor to the finished product. The fineness of texture in the finished cake requires a shortening of better creaming qualities than ordinary butter or margarine. The margarine produced in accordance with the present invention may be satisfactorily employed in cake batter without the addition of any other special shortening to aid in creaming.

The term "supercooling" as employed in the present application will be understood by reference to the heretofore mentioned U. S. Patent No. 1,911,222. In accordance with the teachings of that patent, the fat is supercooled to a temperature of perhaps 15° or 20° below its congealing point. The chilling is done very rapidly and the supercooled fat passes from contact with any chilling medium before any appreciable crystallization takes place. The crystals immediately begin to form and as the first crystals form, the heat of crystallization raises the temperature to a point almost up to the congealing point of the fat. Due to this raise in temperature by reason of the heat of crystallization, the remainder of the crystallization follows at a much slower rate, holding the temperature of the product at or close to the congealing point for a considerable period of time during which the first crystals formed have an opportunity to increase in size, resulting in a product with much larger crystals than can be obtained by the conventional method of chilling over a chilling roll.

As taught in the said patent, by controlling the degree of supercooling and the temperature of the holding room after packaging, it is possible to produce any size crystal desired, ranging from a very fine grained product as would be obtained by chilling over a chill roll, to a very grainy product such as would be obtained if the material were packaged while warm and set in the cooler to crystallize slowly.

It is taught in Patent No. 2,098,010, that coarse emulsions when passed through proper equipment for supercooling fat in the manner which has just been discussed and then agitated in a supercooled condition, become further dispersed and a very fine emulsion is formed. It was taught in that patent that milk or water emulsifies very readily and with extreme ease when agitated with fats which are in a supercooled condition. The agitation of the fat in a supercooled condition causes a very fine dispersion of minute droplets of the dispersed phase of the emulsion. The supercooled product crystallizes or sets up so rapidly that no opportunity is afforded for the coalescence of the finely divided moisture and, consequently, no large droplets are formed. This results in a very fine, stable emulsion.

The present invention is directed to an improvement on that process by which an emulsifying agent of the character described is added to the material being emulsified. The addition of this material performs two functions. It performs the function of eliminating any necessity of employing an ancillary shortening in cake making to assure creaming of the margarine with the other ingredients of the baker's mix. The second function performed by the presence of the superglycerinated fat in the emulsion is a function of crystal control and emulsion characteristics.

Although the size of the crystal may be controlled by the manipulation of temperatures in supercooling and subsequent holding, such control is difficult to obtain. Emulsions prepared in accordance with the teachings of Patent No. 2,098,010, are great improvements over emulsions produced by conventional margarine manufacturing methods. The present invention is a decided improvement over the process taught in that patent in the production of margarines for particular purposes as where an extremely tight emulsion is desired.

It has been found in practice that the emulsion secured by the practice of the present invention is a tighter emulsion than can be secured by the employment of superglycerinated fat as an emulsifying agent and a non-supercooled margarine or by supercooling the emulsion in accordance with the teachings of the patent which has been discussed. It will be appreciated, therefore, that the present invention provides a decided advance in the art of the preparation of emulsions of the type of margarine and results in a product possessing novel properties.

It will be understood that the term "oil" as used in the claims is used in its broadest sense as including fats.

We claim:

1. The method of preparing margarine which comprises melting an oil, adding milk and an ester of a polyhydric alcohol and a higher fatty acid characterized by at least one free alcoholic hydroxyl group in the polyhydric alcohol part of the ester, quickly cooling the oil to a temperature considerably below its congealing point and while the oil remains temporarily as a liquid, dispersing the milk throughout the liquid oil, and permitting the oil to crystallize out at a temperature not above its congealing point.

2. The method of preparing margarine which comprises adding to melted margarine a small percentage of an ester of a polyhydric alcohol and a higher fatty acid characterized by at least one free alcoholic hydroxyl group in the polyhydric alcohol part of the ester, agitating the liquid while at a temperature below the congealing point of the oils therein to secure a fine dispersion of the moisture content, and then allowing the product to crystallize at a temperature slightly below its congealing point.

3. The method of treating an emulsified shortening product which comprises supercooling the melted emulsion below its congealing point, adding a small percentage of an ester of a polyhydric alcohol and a higher fatty acid characterized by at least one free alcoholic hydroxyl group in the polyhydric alcohol part of the ester, agitating while the mixture is supercooled and yet liquid to secure a fine dispersion of the moisture content, and allowing the supercooled liquid to solidify.

4. The method of preparing margarine which comprises supercooling oil containing a small percentage of an ester of a polyhydric alcohol and a higher fatty acid characterized by at least one free alcoholic hydroxyl group in the polyhydric alcohol part of the ester, adding milk and salt to the supercooled oil, agitating while the mixture is supercooled and yet liquid to secure a fine dispersion of the moisture content, and then permitting the supercooled product to solidify.

5. The method of preparing margarine which comprises supercooling oil, adding milk and salt solution containing a small percentage of an ester of a polyhydric alcohol and a higher fatty acid characterized by at least one free alcoholic hydroxyl group in the polyhydric alcohol part of the ester to the supercooled oil, agitating while the mixture is supercooled and yet liquid to secure a fine dispersion of the moisture content, and then permitting the supercooled product to solidify.

6. The method of preparing margarine which comprises supercooling oil to a temperature such that the heat of crystallization will bring the product to a temperature just below the normal congealing point of the oil, adding a small percentage of an ester of a polyhydric alcohol and a higher fatty acid characterized by at least one free alcoholic hydroxyl group in the polyhydric alcohol part of the ester to the supercooled oil, adding milk and salt to the mixture of supercooled oil and ester, and thereafter agitating while the mixture is supercooled and yet liquid to secure a fine dispersion of the moisture content, and thereafter permitting it to solidify.

7. The method of preparing margarine which comprises adding to melted margarine a small percentage of glyceryl ester of a higher fatty acid, said ester having a free glyceryl alcohol group, agitating while the mixture is supercooled and yet liquid to secure a fine dispersion of the moisture content, and then allowing the product to crystallize at a temperature slightly below its congealing point.

8. The method of treating an emulsified shortening product which comprises supercooling the melted emulsion below its congealing point, adding a small percentage of glyceryl ester of a higher fatty acid, said ester having a free glyceryl alcohol group, agitating while the mixture is supercooled and yet liquid to secure a fine dispersion of the moisture content, and allowing the supercooled liquid to solidify.

9. The method of preparing margarine which comprises supercooling oil containing a small percentage of glyceryl ester of a higher fatty acid, said ester having a free glyceryl alcohol group, adding milk and salt to the supercooled oil, agitating while the mixture is supercooled and yet liquid to secure a fine dispersion of the moisture content, and then permitting the supercooled product to solidify.

10. The method of preparing margarine which comprises supercooling oil, adding milk and salt solution containing a small percentage of glyceryl ester of a higher fatty acid, said ester having a free glyceryl alcohol group to the supercooled oil, agitating while the mixture is supercooled and yet liquid to secure a fine dispersion of the moisture content, and then permitting the supercooled product to solidify.

11. The method of preparing margarine which comprises supercooling oil to a temperature such that the heat of crystallization will bring the product to a temperature just below the normal congealing point of the oil, adding a small percentage of glyceryl ester of a higher fatty acid, said ester having a free glyceryl alcohol group to the supercooled oil, adding milk and salt to the mixture of supercooled oil and ester, and thereafter agitating while the mixture is supercooled and yet liquid to secure a fine dispersion of the moisture content, and thereafter permitting it to solidify.

12. The method of preparing margarine which comprises adding to melted margarine a small percentage of an emulsifying agent comprising a mixture of mono and diglycerides of higher fatty acids, agitating the liquid while at a temperature below the congealing point of the oils therein to secure a fine dispersion of the moisture content, and then allowing the product to crystallize at a temperature slightly below its congealing point.

13. The method of treating an emulsified shortening product which comprises supercooling the melted emulsion below its congealing point, adding a small percentage of an emulsifying agent comprising a mixture of mono and diglycerides of higher fatty acids, agitating while the mixture is supercooled and yet liquid to secure a fine dispersion of the moisture content, and allowing the supercooled liquid to solidify.

14. The method of preparing margarine which comprises supercooling oil containing a small percentage of an emulsifying agent comprising a mixture of mono and diglycerides of higher fatty acids, adding milk and salt to the supercooled oil, agitating while the mixture is supercooled and yet liquid to secure a fine dispersion of the moisture content, and then permitting the supercooled product to solidify.

15. The method of preparing margarine which comprises supercooling oil, adding milk and salt solution containing a small percentage of an emulsifying agent comprising a mixture of mono and diglycerides of higher fatty acids to the supercooled oil, agitating while the mixture is supercooled and yet liquid to secure a fine dispersion of the moisture content, and then permitting the supercooled product to solidify.

16. The method of preparing margarine which comprises supercooling oil to a temperature such that the heat of crystallization will bring the product to a temperature just below the normal congealing point of the oil, adding a small percentage of an emulsifying agent comprising a mixture of mono and diglycerides of higher fatty acids to the supercooled oil, adding milk and salt to the mixture of supercooled oil and mono and diglycerides, and thereafter agitating while the mixture is supercooled and yet liquid to secure a fine dispersion of the moisture content, and thereafter permitting it to solidify.

17. The method of preparing margarine which comprises emulsifying a mixture of supercooled liquid oil, an aqueous liquid, and a small percentage of an ester of a polyhydric alcohol and a higher fatty acid characterized by at least one free alcoholic hydroxyl group in the polyhydric alcohol part of the ester, and permitting the emulsion to crystallize at a temperature not above the congealing point of the oil.

18. The method of preparing margarine which comprises emulsifying a mixture of supercooled liquid oil, milk and salt, and a small percentage of an ester of a polyhydric alcohol and a higher fatty acid characterized by at least one free alcoholic hydroxyl group in the polyhydric alcohol part of the ester, and permitting the emulsion to crystallize at a temperature not above the congealing point of the oil.

ROY C. NEWTON.
LEO C. BROWN.